United States Patent
Hofmann et al.

(10) Patent No.: US 12,420,682 B2
(45) Date of Patent: Sep. 23, 2025

(54) ASSEMBLY OF A VEHICLE SEAT HAVING A LINEAR ADJUSTMENT DEVICE

(71) Applicant: BROSE FAHRZEUGTEILE SE & CO. KOMMANDITGESELLSCHAFT, COBURG, Coburg (DE)

(72) Inventors: Jochen Hofmann, Marktgraitz (DE); Mina Makram, Coburg (DE); Bastian Erbacher, Kulmbach (DE); Katharina Wolfahrt, Ebersdorf (DE)

(73) Assignee: BROSE FAHRZEUGTEILE SE & CO. KOMMANDITGESELLSCHAFT, COBURG (DE)

( * ) Notice: Subject to any disclaimer, the term of this patent is extended or adjusted under 35 U.S.C. 154(b) by 344 days.

(21) Appl. No.: 18/019,413

(22) PCT Filed: Jul. 9, 2021

(86) PCT No.: PCT/EP2021/069114
§ 371 (c)(1),
(2) Date: Feb. 2, 2023

(87) PCT Pub. No.: WO2022/013082
PCT Pub. Date: Jan. 20, 2022

(65) Prior Publication Data
US 2023/0286420 A1 Sep. 14, 2023

(30) Foreign Application Priority Data
Jul. 15, 2020 (DE) .................... 10 2020 208 832.2

(51) Int. Cl.
*B60N 2/16* (2006.01)
*B60N 2/02* (2006.01)

(52) U.S. Cl.
CPC ....... *B60N 2/1615* (2013.01); *B60N 2/02246* (2023.08); *B60N 2/164* (2013.01)

(58) Field of Classification Search
None
See application file for complete search history.

(56) References Cited

U.S. PATENT DOCUMENTS 8,177,280 B2 * 5/2012 Yamada .................. B60N 2/62
296/65.05
8,186,737 B2 * 5/2012 Jungert ................ B60N 2/1814
296/65.09

(Continued)

FOREIGN PATENT DOCUMENTS

CN 103298649 A 9/2013
CN 105539213 A 5/2016

(Continued)

OTHER PUBLICATIONS

Chinese Office Action for CN 202180046354.8, English Translation attached to original, Dated Nov. 22, 2024, All together 20 Pages.

(Continued)

*Primary Examiner* — Joseph D. Pape
(74) *Attorney, Agent, or Firm* — Dickinson Wright PLLC

(57) ABSTRACT

An assembly of a vehicle seat comprises a seat part assembly, a floor assembly, a front swivel element that is pivotally coupled to the seat part assembly at a front, upper pivot point, and a rear swivel element that is pivotally coupled to the seat part assembly at a rear, upper pivot point. A drive device includes a linear element and a transmission element operatively connected to the linear element. In a first end position, the linear element takes a first angle to an imaginary line extending through the front, upper pivot point and the rear, upper pivot point, and in a second end position takes a second angle to the line, in an intermediate position the linear element is arranged at a right angle to the line and (Continued)

exceeds the right angle when adjusted between the first end position and the second end position.

20 Claims, 4 Drawing Sheets

(56) References Cited

U.S. PATENT DOCUMENTS

| | | |
|---|---|---|
| 2008/0179932 A1 | 7/2008 | Becker et al. |
| 2010/0213341 A1 | 8/2010 | Beneker et al. |
| 2013/0284874 A1 | 10/2013 | Domgoergen et al. |
| 2020/0086995 A1 | 3/2020 | Cheung |

FOREIGN PATENT DOCUMENTS

| | | | |
|---|---|---|---|
| DE | 2252999 A1 | | 5/1974 |
| DE | 19859238 | * | 7/2000 |
| DE | 19914163 A1 | | 10/2000 |
| DE | 19922993 A1 | | 11/2000 |
| DE | 102017206679 A1 | | 10/2018 |
| JP | 2810000 | * | 12/2001 |
| JP | 2003341393 | | 12/2003 |
| JP | 2008105520 A | | 5/2008 |
| KR | 20150077625 A | | 7/2015 |
| WO | 2012055691 A1 | | 5/2012 |

OTHER PUBLICATIONS

Korean Office Action for Korean Application No. 10-2023-7004938, English Translation attached to original, Dated Apr. 30, 2025, All together 11 Pages.

\* cited by examiner

ASSEMBLY OF A VEHICLE SEAT HAVING A LINEAR ADJUSTMENT DEVICE

CROSS-REFERENCE TO RELATED APPLICATIONS

This application is the U.S. National Phase of PCT Application No. PCT/EP2021/069114 filed on Jul. 9, 2021, which claims priority to German Patent Application No. DE 10 2020 208 832.2 filed on Jul. 15, 2020, the disclosures of which are hereby incorporated in their entirety by reference herein.

TECHNICAL FIELD

The present disclosure relates to an assembly of a vehicle seat.

BACKGROUND

Vehicle seats may include one or more devices to alter the position of the vehicle seat. As an example, a seat height adjustment device may be used for adjusting the height of a seat frame of the seat part assembly relative to the floor assembly, for example relative to a longitudinal adjustment device via which the vehicle seat is coupled to the vehicle floor. Thus, the drive device creates an adjusting force on the seat part assembly in order to adapt a height position of the seat part assembly relative to the floor assembly. To create the adjusting force, the linear element, for example in the form of a spindle, can be moved linearly, and the linear element, for example, is supported on the floor assembly with one end and on the seat part assembly via the transmission element so that an adjusting movement of the linear element causes a change in position of the seat part assembly with respect to the floor assembly.

In such an assembly forming a height adjustment device, the adjustment of the seat part assembly, driven by the drive device, is effected for example in a loaded state of the vehicle seat, i.e. in a state in which a user is sitting on the vehicle seat. Thus, considerable forces possibly are to be applied for adjustment, and the adjustment is effected by pivoting the front swivel element and/or the rear swivel element relative to the seat part assembly, and the seat part assembly thereby is raised or lowered relative to the floor assembly.

SUMMARY

One or more objects of the present disclosure may be to provide an assembly of a vehicle seat which provides for a kinematic that may provide favorable adjustment to a seat part assembly. The kinematic may provide improved acoustics, a simple construction and advantageous force introduction into the seat part assembly.

In one or more embodiments, an assembly provided with a seat part assembly, a floor assembly, a front swivel element and a rear swivel element arranged behind the front swivel element along a longitudinal direction, is provided. The front swivel element is pivotally coupled to the seat part assembly on a front upper pivot point. The rear swivel element on the other hand is pivotally coupled to the seat part assembly on a rear upper pivot point. A drive device includes a linear element extending between the floor assembly and the seat part assembly and a transmission element operatively connected to the linear element. The linear element and the transmission element are linearly adjustable relative to each other in order to adjust the seat part assembly relative to the floor assembly between a first end position and a second end position.

Accordingly, in the first end position the linear element takes a first angle relative to an imaginary line extending through the front upper pivot point and the rear upper pivot point, and in the second end position takes a second angle relative to the imaginary line extending through the front upper pivot point and the rear upper pivot point. The linear element is arranged in an intermediate position at a right angle to the imaginary line extending through the front upper pivot point and the rear upper pivot point and exceeds the right angle when adjusted between the first end position and the second end position.

In the assembly, an adjustment of the seat part assembly relative to the floor assembly is effected by using a linear adjustment device, formed by the linear element and the transmission element, which can be linearly adjusted relative to each other and thereby can cause a change in position on the seat part assembly relative to the floor assembly. The adjustment here can be effected with an advantageous kinematic system, which, for example, may can provide for a uniform adjusting force and hence a constant motor speed of a motor of the drive device and uniform acoustics of the motor.

This is achieved by the fact that due to the arrangement of the linear element, for example in the form of a spindle, relative to the pivot points of the swivel elements arranged on the seat part assembly, an adjusting force can be rendered more uniform along the adjustment path so that during an adjustment of the seat part assembly relative to the floor assembly between the first end position and the second end position a substantially constant action of force is obtained along the adjustment path, and thereby a motor speed only varies to a small extent and more uniform acoustics of a motor of the drive device are obtained.

This is based on the finding that an adjusting force of a linear adjustment device can be assumed to be maximal when the linear element is positioned at a right angle to a line extending between the front upper pivot point of the front swivel element and the rear upper pivot point of the rear swivel element. When during an adjustment of the seat part assembly between the end positions the linear element exceeds an angular range that is arranged around the right angle and may be comparatively small, an adjustment can result in an at least approximately uniform adjusting force and correspondingly a favorable force introduction and favorable kinematics.

In the case of a proper arrangement and use of the assembly in a vehicle, the longitudinal direction is directed along the forward travel direction of the vehicle. The vertical direction, on the other hand, corresponds to the vertical vehicle direction and is directed perpendicularly to the longitudinal direction.

The angle between the linear element and the line extending through the front upper pivot point and the rear upper pivot point is measured in a projection on a plane defined by the longitudinal direction and the vertical direction. Transversely to this plane, the linear element and the swivel elements can be offset from each other. In the projection, the linear element in the intermediate position forms a right angle to the imaginary line extending through the front upper pivot point and the rear upper pivot point and exceeds this right angle when adjusted between the first end position and the second end position of the seat part assembly.

As an example, in the first end position the seat part assembly is approached to the floor assembly. Driven by the drive device, the seat part assembly can be moved out of the first end position into the second end position, and in the second end position for example is raised with respect to the floor assembly and thus away from the floor assembly along a vertical direction extending perpendicularly to the longitudinal direction. Thus, the assembly implements a height adjustment device that provides for an adjustment of the seat part assembly vertically along a vertical direction to the floor assembly in order to adapt a vertical position of the seat part assembly.

In connection with the height adjustment, the adjustment is not exclusively effected along the vertical direction, but along a plane defined by the longitudinal direction and the vertical direction, caused by a swivel movement of the swivel elements, so that during an adjustment of the seat part assembly a superimposed movement is performed along the vertical direction and the longitudinal direction.

In one embodiment, the first angle associated to the first end position is less than 90° and the second angle associated to the second end position is greater than 90°, each measured proceeding from the imaginary line extending through the front upper pivot point and the rear upper pivot point in the direction of an adjustment of the rear swivel element towards the second end position. During an adjustment of the seat part assembly, driven by the drive device, the position of the imaginary line extending through the front upper pivot point and the rear upper pivot point changes as well as the position of the linear element relative to this line. The change in position of the line is effected due to the adjusting movement of the seat part assembly. During an adjustment, the linear element here is pivoted due to its coupling with the floor assembly and the seat part assembly in such a way that the angle between the line and the direction of longitudinal extension of the linear element is changed. During an adjusting movement, the linear element exceeds an angle of 90° to the line extending through the front upper pivot point and the rear upper pivot point, and in the first end position the linear element is arranged on one side of the right angle and in the second end position on the other side of the right angle. Correspondingly, in the first end position the angle for example is less than 90° and in the second end position for example greater than 90°, each measured proceeding from the imaginary line and in the direction of pivoting of the rear swivel element during an adjustment of the seat part assembly from the first end position into the second end position.

In one embodiment, the angular range which is swept during an adjustment of the seat part assembly by the linear element relative to the line extending through the front upper pivot point and the rear upper pivot point can be centered approximately relative to the right angle. At an angle of 90° a maximum adjusting force approximately exists, and the adjusting force may change only slightly over the angular range and thus, a more uniform adjusting force and hence a favorable force introduction and favorable kinematics are obtained for an advantageous operating behavior of the drive device.

In one embodiment, the seat part assembly includes a frame part. The front upper pivot point and the rear upper pivot point here in one embodiment are stationarily arranged on the frame part. The front swivel element and the rear swivel element thus are each pivotable relative to the frame part.

Usually, the seat part assembly includes two frame parts spaced apart from each other along a transverse direction, each having two swivel elements in the form of so-called swing arms arranged thereon, so that on both sides of the seat part assembly (as seen along the transverse direction) an arrangement of swivel elements is created, which provide for an adjustment of the seat part assembly, such as along a vertical direction relative to the floor assembly.

In one embodiment, the front swivel element is pivotally coupled the floor assembly at a front, lower pivot point, and the rear swivel element is pivotally coupled to the floor assembly at a rear, lower pivot point. Thus, the swivel elements form a four-bar linkage jointly with the seat part assembly and the floor assembly so that by pivoting the swivel elements on the seat part assembly a change in position of the seat part assembly relative to the floor assembly can be made possible for example for a vertical adjustment of the seat part assembly.

In one embodiment, the linear element is coupled to the floor assembly at a lower coupling point and to the seat part assembly at an upper coupling point. Thus, the linear element on the one hand is supported on the floor assembly and on the other hand on the seat part assembly, and the coupling each can be articulated in such a way that during an adjustment of the seat part assembly the linear element can change its pivot position both relative to the floor assembly and relative to the seat part assembly.

For example, the linear element with one end can be articulated to the floor assembly, for example to an upper guide rail of a longitudinal adjustment device of the vehicle seat implementing the floor assembly. In this case, the transmission element for example can be part of an adjusting gear unit that is pivotally arranged on the seat part assembly and provides for driving the transmission element for a linear adjustment along the linear element.

In one embodiment, the lower coupling point of the linear element, as seen along the longitudinal direction, is arranged behind the rear, lower pivot point of the rear swivel element. Thus, the linear element is arranged at a place on the floor assembly that is located behind the connecting point of the rear swivel element on the floor assembly, as seen along the longitudinal direction.

Additionally or alternatively, the lower coupling point can be arranged below an imaginary line extending through the front, lower pivot point and the rear, lower pivot point. The lower coupling point, at which the linear element is supported on the floor assembly, thus is arranged on a side of the line extending through the front, lower pivot point and the rear, lower pivot point, which faces away from the seat part assembly.

In one embodiment, the upper coupling point can be stationarily arranged on the seat part assembly. For example, the upper coupling point can be arranged above the imaginary line extending through the front upper pivot point and the rear upper pivot point.

By arranging the lower coupling point behind and below the rear, lower pivot point of the rear swivel element and by arranging the upper coupling point above the rear upper pivot point—which may also before the rear upper pivot point—it can be achieved that during an adjusting movement of the seat part assembly the linear element only experiences a comparatively small change in position and thus is adjusted relative to the seat part assembly only over a comparatively small angular range. Because the position of the linear element relative to the seat part assembly at least approximately remains perpendicular and the linear element extends in a narrow range around the right angle to the line extending between the upper pivot point of the swivel elements, the kinematic force profile is rendered more uniform and thus a favorable operating behavior is obtained.

In one embodiment, the linear element, as seen in a projection on a plane defined by the longitudinal direction and the vertical direction, always intersects an imaginary line extending between the rear, lower pivot pint and the rear upper pivot point of the rear swivel element. The imaginary line substantially corresponds to the direction of longitudinal extension of the rear swivel element. Thus, the linear element always—i.e. in the entire adjustment range—intersects the rear swivel element. The linear element here is at least approximately perpendicularly aligned and is pivoted over an angular range that may be distinctly smaller than the swivel angle of the swivel element.

In one embodiment, the amount of a first angular difference between the first angle and the right angle and/or of a second angular difference between the second angle and the right angle is less than 45°, such as less than 30°, or less than 20°. Thus, the angular adjustment of the linear element relative to the imaginary line extending through the front upper pivot point and the rear upper pivot point may be small, for example less than 90°, such as than 60°, or less than 40°, so that during an adjustment the linear element sweeps over a comparatively small angle and hence undergoes a small angular change relative to the seat part assembly. Thus, during an adjustment the linear element remains aligned substantially perpendicularly, with a more uniform force introduction and thus with an at least approximately constant adjusting force along the adjustment path.

During an adjustment of the seat part assembly between the first end position and the second end position relative to the floor assembly, the transmission element and the linear element in one embodiment move relative to each other along a linear adjustment path which is greater than a vertical stroke of the seat part assembly. During an adjustment, the transmission element is adjusted linearly to the linear element. When the transmission element covers a larger path relative to the linear element than the seat part assembly in a vertical direction relative to the floor assembly, an advantageous gear ratio is obtained, at which a comparatively small adjusting force of a drive motor of the drive device is translated into a larger adjusting force on the seat part assembly for adjusting the seat part assembly relative to the floor assembly.

In one embodiment, the linear element is formed by a spindle. The transmission element on the other hand is formed by a spindle nut that is in threaded engagement with the spindle. On an inner bore, the spindle nut therefor can have a thread that is in engagement with an external thread of the spindle so that during a rotation the spindle nut rolls off on the spindle and the spindle thereby is adjusted longitudinally with respect to the spindle nut. The spindle nut, driven by a drive motor, for example can be put into a rotary movement in order to rotate the spindle nut relative to the spindle and thereby adjust the spindle and the spindle nut longitudinally with respect to each other.

In one embodiment, the drive device includes an electric motor for driving a linear adjustment of the linear element relative to the transmission element. The electric motor for example can act on the transmission element in the form of a spindle nut in order to rotate the spindle nut relative to the linear element in the form of a spindle and thereby adjust it longitudinally along the spindle. The transmission element for example can be stationarily (but possibly pivotally) supported on the seat part assembly so that due to the adjustment an adjusting force is introduced into the seat part assembly and the seat part assembly is adjusted relative to the floor assembly.

For driving the transmission element in the form of a spindle nut, a drive element in the form of a drive worm for example can be operatively connected to the spindle nut, and the drive worm is driven via the drive motor.

Instead of being designed as a spindle, the linear element for example can also be formed by a toothed rack that is in engagement with a transmission element in the form of a gear wheel.

As an alternative to an electromotive configuration of the drive device it is also conceivable that an adjusting gear unit is to be actuated manually by manually driving the drive device. Alternatively, the drive in turn can also be of the hydraulic or pneumatic type.

BRIEF DESCRIPTION OF THE DRAWINGS

The idea underlying the invention will be explained in detail below with reference to the exemplary embodiments illustrated in the Figures, in which.

DETAILED DESCRIPTION

An adjusting force applied by the drive device may vary along the adjustment path during an adjustment of the seat part assembly and this can lead to a variation in the motor speed and hence to non-uniform acoustics, which a user possibly perceives as unpleasant. Therefore, there is a desire to provide a kinematic system for adjusting the seat part assembly, which provides for a uniform adjustment with an at least approximately constant adjusting force and hence constant motor speed and acoustics.

DE 199 14 163 A1 discloses a known vehicle seat with a height-adjustable seat part. The seat part is coupled to the seat rail via swivel elements in the form of swing arms. Via a linearly adjustable drive in the form of a spindle drive, the seat part can be adjusted in its height position relative to the seat rail.

Other types of vehicle seats with height-adjustable seat parts are known for example from U.S. Publication No. 2010/213341 A1 and U.S. Publication No. 2008/179932 A1.

U.S. Publication No. 2020/086995 A1 discloses a known seat arrangement in which a linear adjuster with one end engages a floor assembly and with another end engages a swivel element and can cause a height adjustment of a seat part by linearly adjusting a linear element in the form of a spindle.

Figure 1:
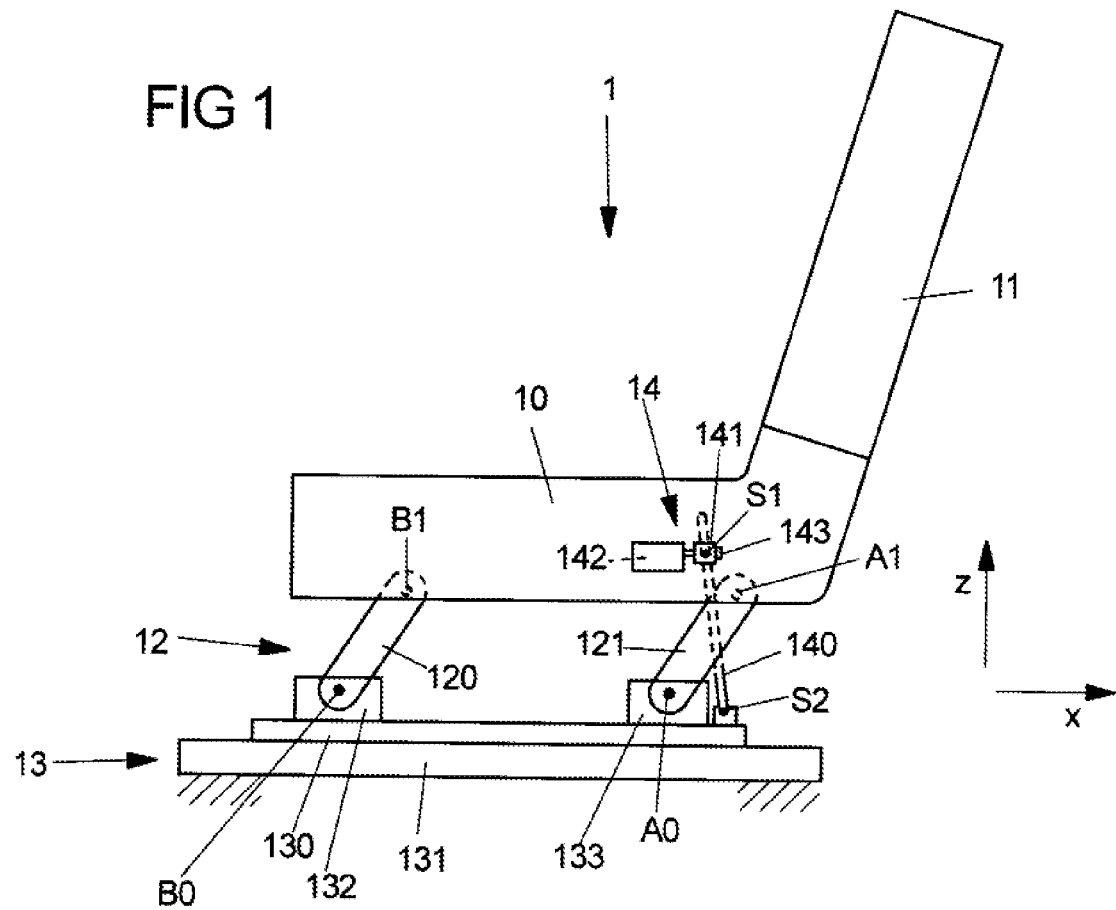
FIG. 1 shows a schematic view of a vehicle seat having a height-adjustable seat part assembly.

In one exemplary embodiment, a vehicle seat 1 shown in FIG. 1 includes a seat part assembly 10 on which a backrest part 11 is arranged (tilt-adjustably) and which forms a seating surface for a vehicle occupant. The seat part assembly 10 can be formed for example by a seat frame on which for example a seat pan is arranged to provide a seating surface, and the seat pan can be adjustable relative to the seat frame in order to set for example a seat inclination.

In the illustrated exemplary embodiment, the seat part assembly 10 is connected to a floor assembly 13 via a height adjustment device 12, which floor assembly is formed by a longitudinal adjustment device for longitudinally adjusting the vehicle seat 1 along a longitudinal direction X.

The height adjustment device 12 includes swivel elements 120, 121 that couple the seat part assembly 10 to the floor assembly 13 in the form of the longitudinal adjustment device. On each side of the seat part assembly 10 (as seen along a transverse direction extending transversely to the longitudinal direction X and transversely to a vertical direction Z) two pairs of swivel elements 120, 121 can be arranged so that the seat part assembly 10 is supported and adjustable on both sides via one four-bar linkage each that is formed jointly with the seat part assembly 10 and the floor assembly 13.

The swivel elements 120, 121 each are articulated to the seat part assembly 10 and the floor assembly 13. A front swivel element 120—which when viewed in a forward travel direction of the vehicle is arranged before a rear swivel element 121 located behind the same, when the vehicle seat 1 is properly arranged and used—is pivotally arranged on a front attachment part 132 of an upper guide rail 130 of the floor assembly 13 via a front, lower pivot point B0 and is pivotally coupled to the seat part assembly 10 at a front upper pivot point B1. At a rear, lower pivot point A0, the rear swivel element 121 on the other hand is pivotally connected to a rear attachment part 133 arranged on the upper guide rail 130 and is pivotally coupled to the seat part assembly 10 at a rear upper pivot point A1. The upper guide rail 130 is translatable and guided on a lower guide rail 131 along the longitudinal direction X so that by shifting the guide rails 130, 131 relative to each other, the longitudinal position of the vehicle seat 1 can be adapted.

When the seat part assembly 10 is adjusted relative to the floor assembly 13, the swivel elements 120, 121 each pivot about their pivot points B0, B1, A0, A1 so that the position of the seat part assembly 10 relative to the floor assembly 13 thereby is changed and the seat part assembly 19 for example, may be adjusted in its height position along the vertical direction Z.

For adjusting the seat part assembly 10, a drive device 14 on the one hand is operatively connected to the seat part assembly 10 and on the other hand to the floor assembly 13.

The drive device 14 includes a linear element 140 for example in the form of a spindle, which is articulated to the upper guide rail 130 of the floor assembly 13 at a coupling point S2 and is coupled to the seat part assembly 10 via a transmission element 141 for example in the form of a spindle nut. The transmission element 141 is pivotally mounted on the seat part assembly 10 and forms a coupling point S1 via which the linear element 140 in the form of the spindle is supported on sides of the seat part assembly 10.

An electric motor 142 serves for driving a drive element 143 in the form of a drive worm that is connected to the transmission element 141 in the form of the spindle nut. Driven by the electric motor 142, the transmission element 141 thus can be put into a rotary movement so that the transmission element 141 in the form of the spindle nut rolls off on the spindle 140 due to a threaded engagement with the linear element 140 in the form of the spindle and thereby is longitudinally adjusted along the spindle 140.

In the illustrated exemplary embodiment, the linear element 140 in the form of the spindle extends substantially perpendicularly between the seat part assembly 10 and the floor assembly 13. When the seat part assembly 10 is adjusted relative to the floor assembly 13, the position of the linear element 140 relative to the seat part assembly 10 and also relative to the floor assembly 13 is changed, and due to the arrangement and coupling of the linear element to the seat part assembly 10 and the floor assembly 13, the linear element 140 substantially maintains its perpendicular orientation during an adjustment. This provides for kinematics in which an adjusting force can be rendered more uniform along the adjustment path of the seat part assembly 10 relative to the floor assembly 13.

Figure 2A:
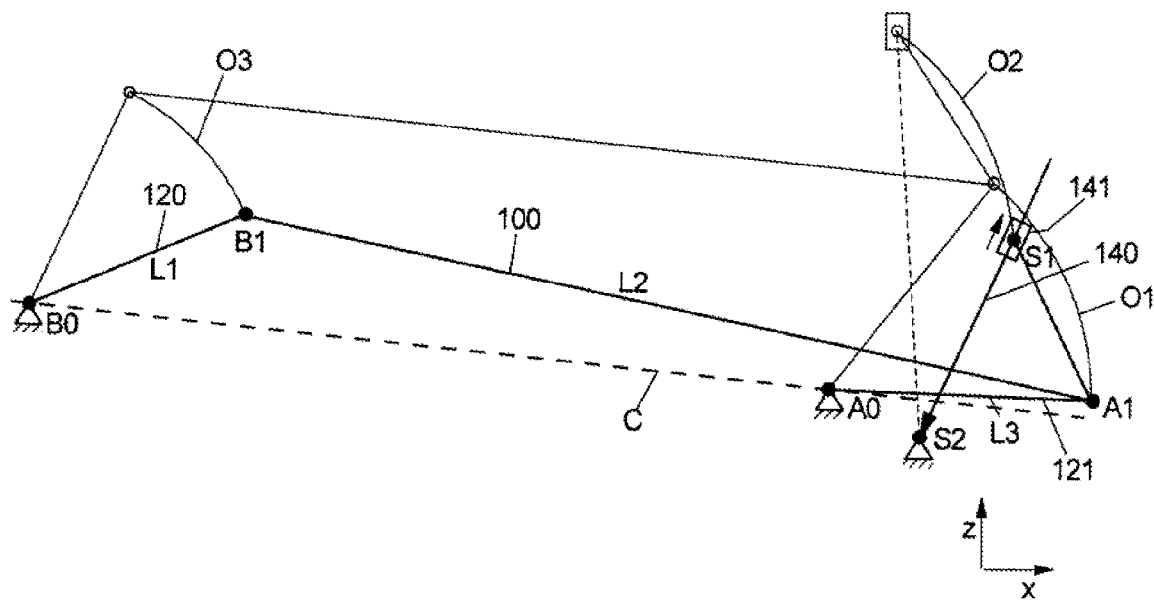
FIG. 2A shows a schematic view of the kinematics of a height adjustment of the seat part assembly, in a lowered position.
Figure 2B:
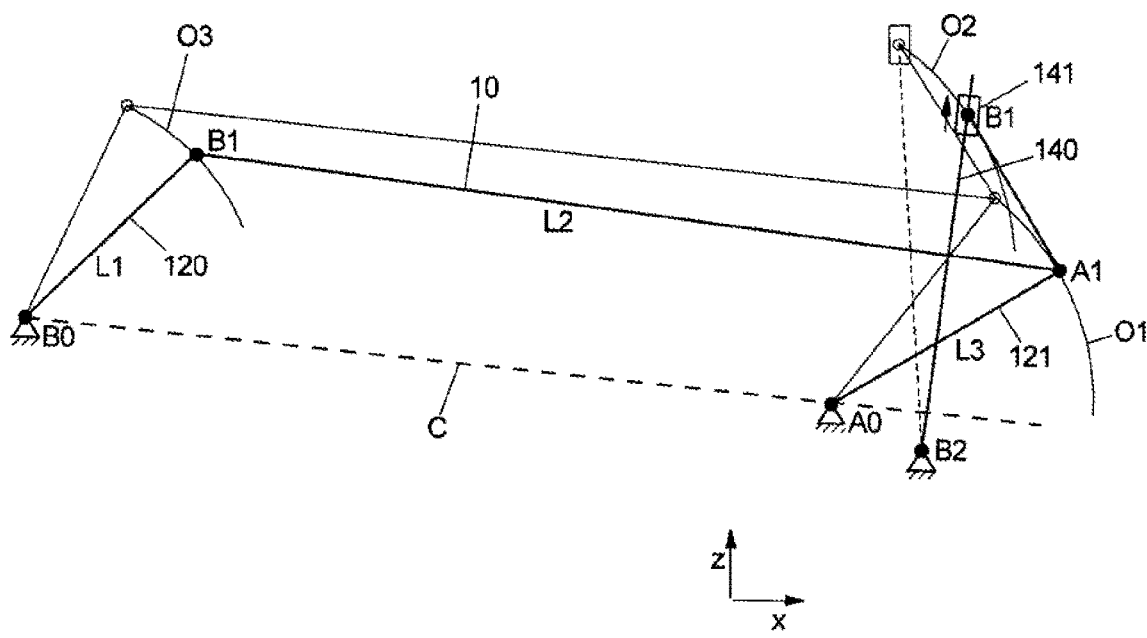
FIG. 2B shows a view of the kinematics, in an intermediate position on raising of the seat part assembly.

This is illustrated in FIGS. 2A and 2B. FIG. 2A shows the position of the pivot points A0, A1, B0, B1 of the swivel elements 120, 121 in a lowered position of the seat part assembly 10, and FIG. 2B shows the position of the pivot points A0, A1, B0, B1 in an intermediate position raised with respect to the position of FIG. 2A.

In the illustrated exemplary embodiment, the linear element 140 is coupled to the floor assembly 13 at a coupling point S2 that is arranged behind and below the lower pivot point A0 of the rear swivel element 121, namely below a line C that connects the lower pivot points A0, B0 of the swivel elements 120, 121 to each other. The upper coupling point S1, which is defined by the transmission element 141 pivotally arranged on the seat part assembly 10, here is arranged above a line L2 extending through the upper pivot points A1, B1. The linear element 140 intersects a line L3 between the pivot points A0, A1 of the rear swivel element 121. This applies each in a projection on a plane defined by the longitudinal direction X and the vertical direction Z, corresponding to the drawing plane of FIGS. 2A and 2B, and the linear element 140 can be arranged offset from the swivel elements 120, 121 along a transverse direction extending perpendicularly to this plane or also approximately in the same plane.

In the lowered position as shown in FIG. 2A, which corresponds to a lower end position of the seat part assembly 10 on the adjustment path relative to the floor assembly 13, the linear element 140 extends at an angle α0 to the line L2 extending between the upper pivot points A1, B1 of the swivel elements 120, 121, as this can be taken from FIG. 2A (the angle α0 is measured proceeding from the line L2 in the direction of an adjustment of the rear swivel element 121 from the lowered end position into a raised position). The angle α0 here is less than 90°.

When the seat part assembly 10 is adjusted for raising the seat part assembly 10 relative to the floor assembly 13, the transmission element 141 is linearly adjusted on the linear element 140 and the distance between the coupling points S1, S2 thereby is increased, as this is shown at the transition from FIG. 2A towards FIG. 2B. FIG. 2B shows an intermediate position in which the linear element 140 is just arranged at a right angle to the line L2 between the upper pivot points A1, B1 of the swivel elements 120, 121.

In the position as shown in FIG. 2B, the swivel elements 120, 121 are pivoted out of the position as shown in FIG. 2A, and the upper pivot points A1, B1 move along respectively associated locus curves O1, O3, but the lower pivot points A0, B0 remain stationary on the associated guide rail 130 of the floor assembly 13. Moreover, the linear element 140 also is pivoted relative to the floor assembly 13, and the transmission element 141, which defines the upper coupling point S1, moves along a locus curve O2, and the linear element 140 in the position shown in FIG. 2B just takes a right angle to the line L2 extending through the upper pivot points A1, B1 of the swivel elements 120, 121.

When pivoted further in the direction of an upper end position, likewise indicated in FIG. 2A, the linear element 140 exceeds the right angle to the line L2 and in the upper end position, as indicated in FIG. 2A, takes an angle $\alpha1$ to the line L2. The angle $\alpha1$ here is greater than 90°. The angular difference between the first angle $\alpha0$ associated to the lower end position and the right angle on the one hand and the second angle $\alpha1$ associated to the upper end position and the right angle here however each is comparatively small, for example less than 20°, so that the linear element 140 changes its position relative to the line L2 describing the position of the seat part assembly 10 and extending through the upper pivot points A1, B1 only in a comparatively small angular range and on the entire adjustment path is aligned at least approximately perpendicularly to the line L2.

During an adjustment, the linear adjustment path of the transmission element 141 relative to the linear element 140 is greater than the stroke of the seat part assembly 10 along the vertical direction Z, which effects that the drive device 14 provides a gear ratio to the effect that a comparatively small adjusting force on the electric motor 142 is converted into a greater adjusting force on the seat part assembly 10.

Figure 3A:
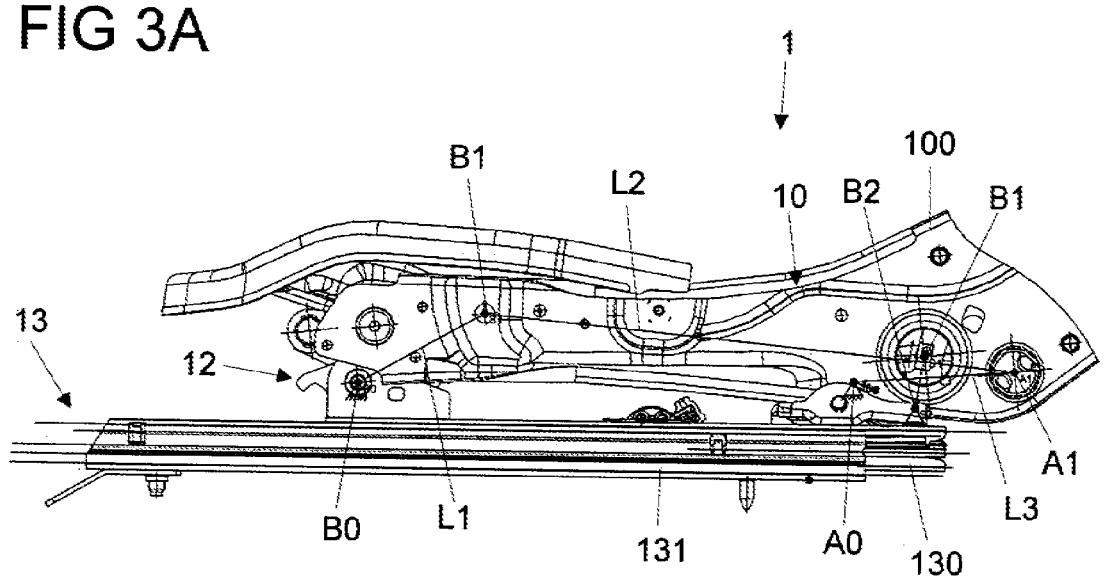
FIG. 3A shows a view of an exemplary embodiment of a seat part assembly, in a lowered position.
Figure 3B:
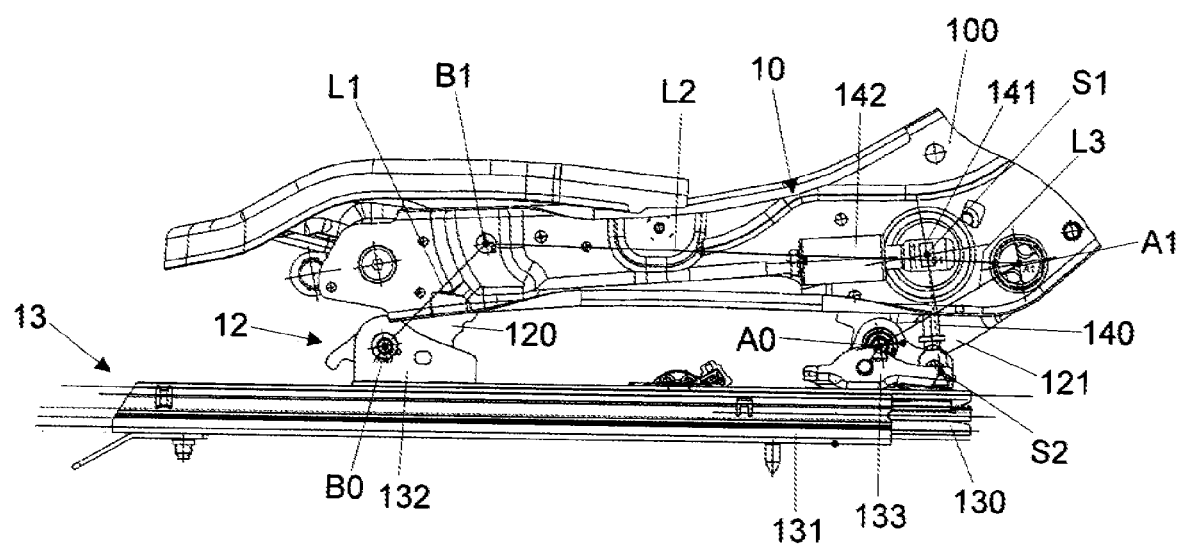
FIG. 3B shows a view of the seat part assembly, on raising.

FIGS. 3A and 3B illustrate the kinematics with reference to a concrete exemplary embodiment of a seat part assembly 10, in which the swivel elements 120, 121 are mounted on a lateral frame part 100 of the seat part assembly 10 and the transmission element 141 is enclosed in a housing of an adjusting gear unit that is pivotally received on the frame part 100. The kinematics here are analogous to what has been explained with reference to FIGS. 2A and 2B.

Figure 4:
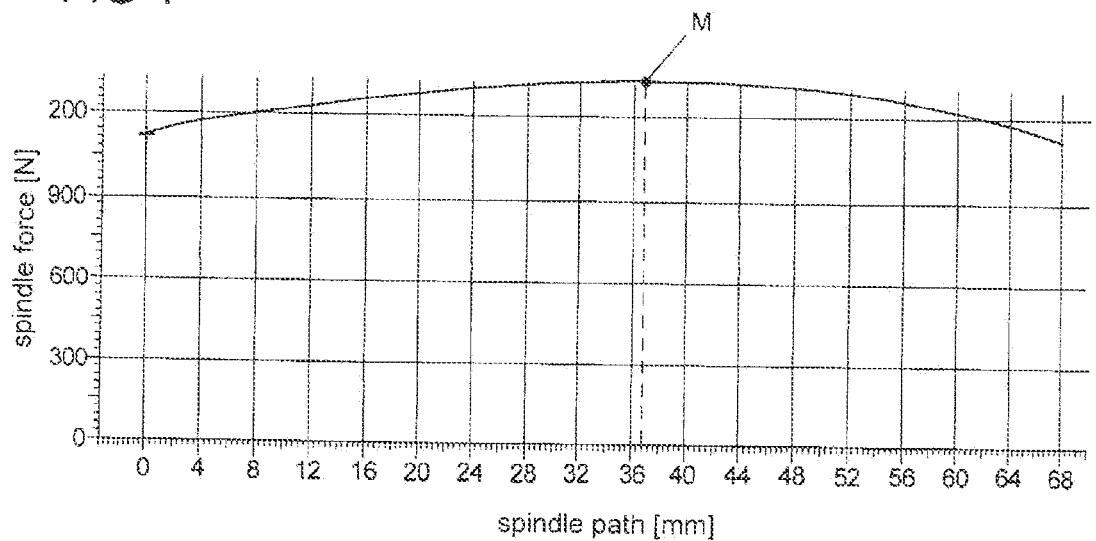
FIG. 4 shows a view of the adjusting force along the adjustment path of a transmission element relative to a linear element in the form of a spindle.

The arrangement and alignment of the linear element 140 between the seat part assembly 10 and the floor assembly 13 results in an at least approximately uniform adjusting force along the adjustment path of the seat part assembly 10, as this is shown in FIG. 4. The adjusting force varies only over a comparatively small range of values along the adjustment path between the end positions of the seat part assembly 10. The adjusting force on the seat part assembly 10 here has a maximum M when the linear element 140 in the intermediate position shown in FIG. 2B just takes a right angle to the line A2 between the upper pivot points A1, B1 of the swivel elements 120, 121.

Figure 5:
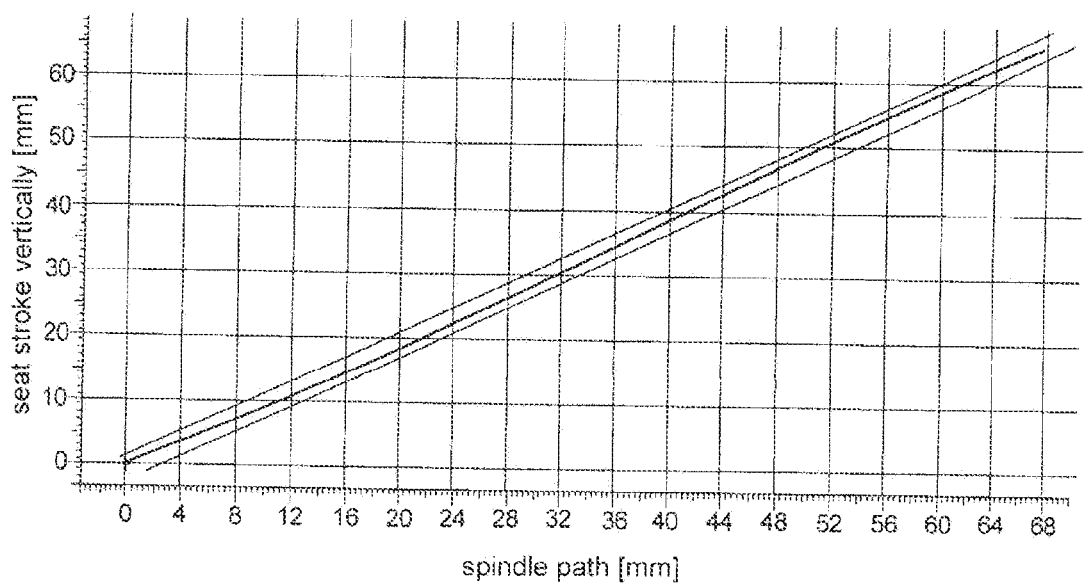
FIG. 5 shows a view of a seat stroke along the adjustment path of the transmission element on the linear element in the form of the spindle.

The described kinematics also result in a uniform, linear translation of the linear movement of the transmission element 141 relative to the linear element 140 into a lifting movement of the seat part assembly 10, as this is shown in FIG. 5.

Due to the more uniform adjusting force and the linear translation, a favorable operating behavior is obtained, with little variation of the motor speed in operation and hence uniform motor acoustics.

The linear element 140 can be formed comparatively short, which results in a comparatively short adjustment path of the transmission element 141 relative to the linear element 140. This results in a comparatively short buckling length, which provides for a light-weight design of the linear element 140, for example by designing a spindle with small spindle diameter.

The idea underlying the invention is not limited to the exemplary embodiments described above, but can also be realized in a different way.

The linear element can be formed by a spindle, which however is not absolutely necessary. In an alternative embodiment, the linear element can be formed for example by a toothed rack or another linearly extending assembly, for example an electric, hydraulic or pneumatic linear adjuster.

LIST OF REFERENCE NUMERALS 1 vehicle seat
10 seat part assembly
100 frame part
11 backrest part
12 height adjustment device
120, 121 swivel element (swing arm)
13 floor assembly (longitudinal adjustment device)
130 upper guide rail
131 lower guide rail
132, 133 attachment part
14 drive device
140 linear element (spindle)
141 transmission element (spindle nut)
142 motor
143 drive element (drive worm)
$\alpha0$, $\alpha1$ angle
A0, A1 pivot point
B0, B1 pivot point
C (imaginary) connecting line
L1-L3 line
M maximum
O1-O3 locus curve
S1, S2 coupling point
X longitudinal direction
Z vertical direction

The invention claimed is:

1. A vehicle seat assembly comprising:
a seat part assembly;
a floor assembly;
a front swivel element pivotally coupled to a front upper pivot point of the seat part assembly;
a rear swivel element arranged behind the front swivel element with respect to a longitudinal direction, the rear swivel element pivotally coupled to a rear upper pivot point of the seat part assembly; and
a drive device provided with a linear element and a transmission element, the linear element extending between the floor assembly and the seat part assembly, the transmission element operatively connected to the linear element,
wherein the linear element and the transmission element are each linearly adjustable relative to each other to adjust the seat part assembly relative to the floor assembly between a first end position, in which the linear element forms a first angle with respect to an imaginary line extending through the front upper pivot point and the rear upper pivot point, and a second end position in which the linear element forms a second angle with respect to the imaginary line, wherein the seat part assembly is configured to be adjusted to an intermediate position, in which the linear element is disposed
at a right angle to the imaginary line and an angle of the linear element exceeds the right angle in response to the seat part assembly being adjusted between the intermediate position and the second end position.

2. The assembly of claim 1, wherein the first end position is closer to the floor assembly than the second end position.

3. The assembly of claim 2, wherein the first angle is less than 90" and the second angle is greater than 90°.

4. The assembly of claim 1, wherein the seat part assembly includes a frame part, and the front upper pivot point and the rear upper pivot point are each fixed on and formed by the frame part.

5. The assembly of claim 1, wherein the front swivel element pivotally coupled to the floor assembly at a front lower pivot point, and the rear swivel element pivotally coupled to the floor assembly at a rear lower pivot point.

6. The assembly of claim 5, wherein the linear element is coupled to the floor assembly at a lower coupling point and to the seat part assembly at an upper coupling point.

7. The assembly of claim 6, wherein the lower coupling point is disposed behind the rear lower pivot point with respect to the longitudinal direction.

8. The assembly of claim 6, wherein the lower coupling point is disposed below a second imaginary line extending through the front lower pivot point and the rear lower pivot point.

9. The assembly of claim 6, wherein the upper coupling point is fixed on the seat part assembly.

10. The assembly of claim 6, wherein the upper coupling point is disposed above the imaginary line extending through the front upper pivot point and the rear upper pivot point.

11. The assembly of claim 5, wherein as the seat part assembly is adjusted between the first end position and the second end position, the linear element constantly intersects a second imaginary line extending between the rear lower pivot point and the rear upper pivot point with respect to a projection of a plane defined by the longitudinal direction and a vertical direction.

12. The assembly of claim 1, wherein a first angular difference between the first angle and the right angle is less than 45°.

13. The assembly of claim 1, wherein the seat part assembly is configured to move along a vertical stroke from the first end position to the second end position, and the transmission element and the linear element collectively move along a linear adjustment path relative to the floor assembly, and wherein the linear adjustment path is greater than the vertical stroke of the seat part assembly.

14. The assembly of claim 1, wherein the linear element is formed by a spindle and the transmission element is formed by a spindle nut, the spindle nut in threaded engagement with the spindle.

15. The assembly of claim 1, wherein the drive device includes an electric motor configured to generate a linear adjustment of the linear element relative to the transmission element.

16. The assembly of claim 1, wherein a second angular difference between the second angle and the right angle is less than 45°.

17. The assembly of claim 1, wherein a first angular difference between the first angle and the right angle is less than 30°.

18. A vehicle seat assembly comprising:
a seat part assembly including a front upper pivot point and a rear upper pivot point, the rear upper pivot point disposed rearward of the front upper pivot point;
a floor assembly including a coupling point;
a front swivel element pivotally coupled to the front upper pivot point;
a rear swivel element pivotally coupled to the rear upper pivot point;
a linear element extending from the coupling point of the floor assembly to the seat part assembly;
a transmission element operatively connected to the linear element and fixed to the seat part assembly, the transmission element configured to translate along the linear element and the linear element configured to articulate about the coupling point so that the seat part assembly is adjusted relative to the floor assembly between a first end position, in which the linear element forms a first angle with respect to an imaginary line extending through the front upper pivot point and the rear upper pivot point, and a second end position in which the linear element forms a second angle with respect to the imaginary line.

19. The vehicle seat of claim 18, wherein the seat part assembly includes a frame and the front upper pivot point is fixed to the frame.

20. The vehicle seat of claim 18, wherein the floor assembly includes a front lower pivot point and a rear lower pivot point, the front swivel element pivotally coupled to the front lower pivot point, the rear swivel element pivotally coupled to the rear lower pivot point, wherein the coupling point is disposed rearward of the rear lower pivot point.

* * * * *